Nov. 4, 1941.    L. DILLON ET AL    2,261,108
PROCESS FOR DEASPHALTING OIL
Filed April 27, 1936
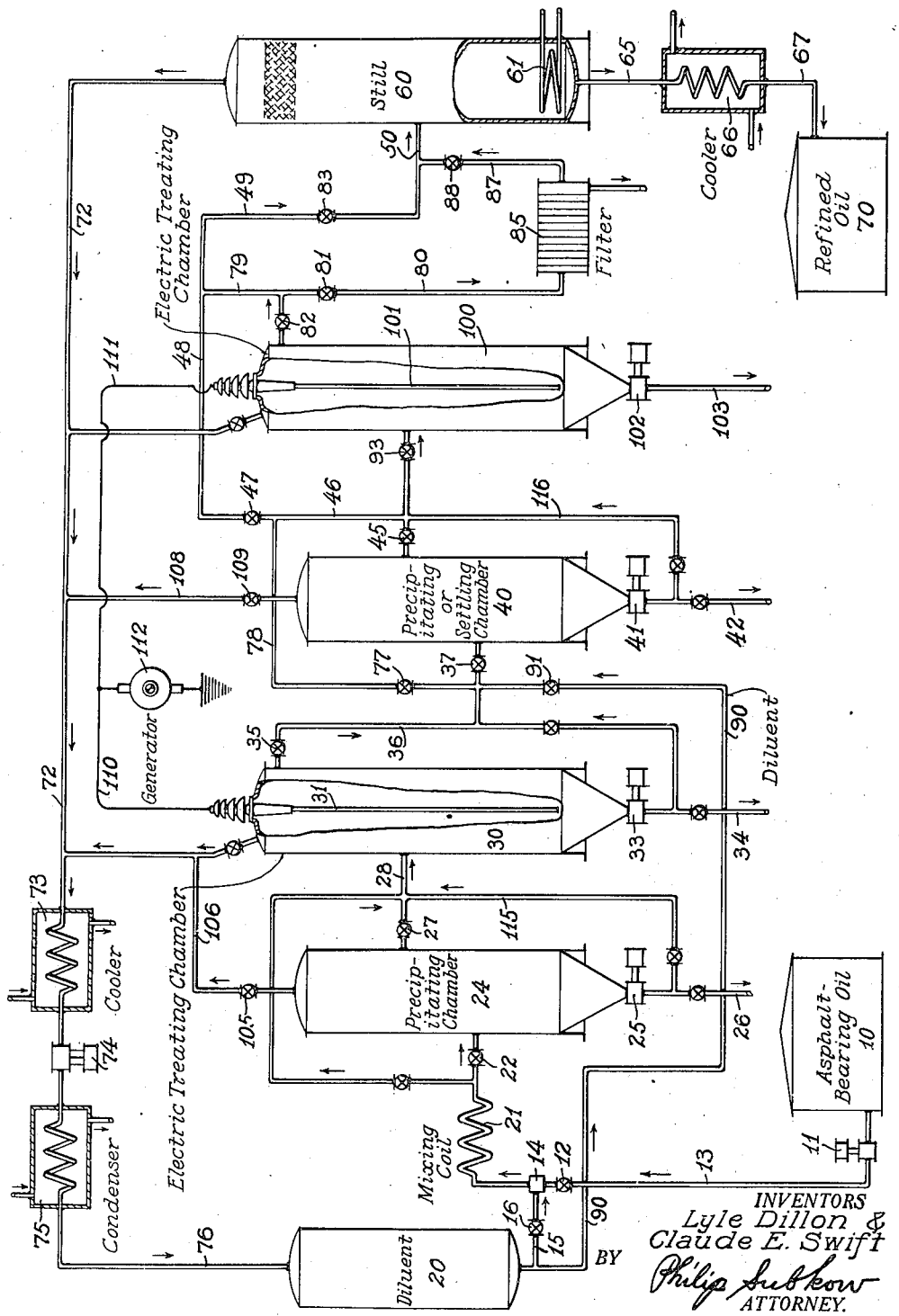
INVENTORS
Lyle Dillon &
Claude E. Swift
BY Philip Subkow
ATTORNEY.

Patented Nov. 4, 1941

2,261,108

UNITED STATES PATENT OFFICE 2,261,108

PROCESS FOR DEASPHALTING OIL

Lyle Dillon and Claude E. Swift, Glendale, Calif., assignors to Union Oil Company of California, Los Angeles, Calif., a corporation of California Application April 27, 1936, Serial No. 76,574

21 Claims. (Cl. 204—184)

The invention relates to the separation of asphaltic, pseudo-asphaltic, resinous, tarry, waxy, and the like bodies, from oil, and is a continuation in part of copending applications, Serial No. 680,710, filed July 17, 1933, and Serial No. 681,888, filed July 24, 1933.

In the above mentioned copending applications, a process was disclosed for dewaxing waxbearing oil comprising precipitating the wax in the oil preferably by quick cooling or "shock chilling," in the presence of a diluent where the oil is highly viscous at reduced temperatures, and electrically treating the resulting waxy oil-mixture to agglomerate or otherwise render the resulting wax precipitate more readily separable from the oil by subsequent settling, centrifuging or filtration methods. The same copending applications also disclosed the separation of wax from oil by electrically depositing or plating the wax precipitate from the wax-precipitate-oilmixture upon an electrode surface in contact with the mixture under the influence of an electric field.

It has been discovered that the advantages of electrically treating oils is not limited to the dewaxing processes but is useful in similar processes, as stated in the copending applications, for deasphalting and deresinating oils and for the effective removal of similar substances, such as pseudo-asphaltic, tarry, gummy and waxy constituents, and certain color bodies. Heretofore, the removal of these undesirable bodies from the oil has been accomplished by well known acid and alkali treatments and more recently by solvent processes.

In the first mentioned process for deasphalting oil employing acid treatment, the oil containing asphaltic and color bodies is intimately mixed with a suitable quantity of strong sulfuric acid by which the asphaltic, resinous and color bodies and gum forming constituents are oxidized or polymerized and are subsequently removed with the acid sludge which is thereby formed. These processes have well known definite disadvantages. In the acid treatment valuable constituents of the oil in addition to those undesirable asphaltic and resinous bodies also react chemically with the acid and are destroyed and other valuable oil constituents are carried away with the separated sludge. Moreover, a finely divided acid sludge suspension known as pepper sludge, is often formed which persists in the form of a suspension indefinitely in the desirable portion of the treated oil and cannot be effectively removed by ordinary processes.

In the second mentioned process in which solvents are employed, the oil containing the undesirable high molecular weight bodies such as asphalt, resin and the like is dissolved in a quantity of a suitable diluent such as liquid propane or other liquid normally gaseous hydrocarbon which has, preferably at normal temperatures, low solvent power for the asphaltic and high molecular weight material while at the same time retaining practically complete solvent power for the desirable fractions of the oil. Such solvent treatment results in the rejection of asphaltic bodies from the oil-diluent solution in the form of a relatively heavy insoluble precipitate, a substantial portion of which may be separated from the oil solution by settling in a reasonable length of time.

In this solvent deasphalting process a substantial portion of the asphaltic precipitate is ordinarily readily separated from the oil solution by settling as stated hereinbefore, but a sufficient quantity of the precipitate may remain in the oil solution in the form of an unsettled, finely divided suspension, to cause serious contamination of the final product unless special steps are taken for its complete removal.

It is therefore an object of this invention to obviate the hereinabove enumerated disadvantages and difficulties associated with these methods of refining oils. It is a further object of this invention to reduce the time for and increase the completeness of the removal of asphaltic, resinous and the like bodies from oils. Other objects of this invention are to provide a process for the separation of precipitated asphalt from asphaltbearing oil which will be complete, in which the time of settling and separation of the asphalt is greatly reduced and by which fine suspended precipitates can be successfully and quickly separated.

It is also an object of this invention to provide a method whereby waxy and asphaltic constituents can be simultaneously removed and in which the waxy and asphaltic constituents can be precipitated preparatory to such removal by "shock chilling."

In general these objects are obtained by subjecting the oil to be refined to the action of an electric field.

The invention broadly stated, comprises a method of refining oil wherein the oil containing the undesirable matter in the form of a suspended precipitate is subjected to an electric field whereby the precipitate is agglomerated and/or otherwise rendered more readily separable by settling or filtration or by electrodeposition in a layer upon an electrode surface.

The invention more generally stated, comprises the same electrical method for removing from oils asphalt, high molecular weight bodies, color bodies, resinous, tarry, waxy, fatty, and the like constituents.

The invention more specifically stated comprises a method for deasphalting and/or deresinating oils wherein the asphaltic and resinous bodies are precipitated or caused to be precipitated in the oil in the form of a suspension of solid or semi-solid discrete particles by employing suitable diluents or anti-solvents or by chilling, followed by electrical treatment of the oil precipitate mixture by an intense electric field to agglomerate and/or to render the precipitate more readily separated from the oil by settling or filtration or by electrodeposition upon electrode surfaces.

The invention additionally includes simultaneous electrical deasphalting and dewaxing and also electrical deasphalting and dewaxing in stages.

Other objects, advantages and novel features of the invention will be evident hereinafter.

The accompanying drawing illustrates one embodiment of the invention with which the following process of the invention for deasphalting and deresinating oil may be performed.

The asphalt-bearing oil to be refined, such as for example lubricating oil stock obtained by topping an asphaltic or mixed asphaltic and paraffinic crude oil, is withdrawn from the supply tank 10 by means of pump 11 and flows continuously through valve 12 and line 13 to mixing junction 14 where it meets and mixes with a stream of a suitable liquid such as liquid propane, which possesses antisolvent properties for the asphaltic materials in oil. The liquid diluent is supplied in suitable quantity to the mixing junction 14 through line 15 and valve 16 under pressure from the diluent storage tank 20. The thus formed mixture of asphalt-bearing oil and antisolvent diluent passes through the agitating and mixing coil 21 and thence through valve 22 into the first asphalt precipitating chamber 24. Here the asphaltic constituents of the oil appear as a precipitate, the heavier portions of which may be rapidly settled into the conical bottom portion of the precipitating chamber. This settled precipitate ordinarily comprises a heavy sediment of materials ranging in character from nearly pure bitumen to asphaltic and pseudo-asphaltic materials containing in admixture therewith a substantial portion of the oil diluent solution. This sedimentary asphaltic precipitate material is expelled from the chamber 24 through pump 25 and line 26 to a suitable disposal system where the included oil and diluent can be recovered. When liquid propane is thus employed as the diluent, the chamber 24 and the pipe lines leading thereto from the diluent supply tank 20 are maintained under a pressure of approximately 125 pounds per square inch gauge, which is sufficient to maintain the diluent in the liquid phase under the usual normal operating temperatures of 70°–80° F. in this stage of the process.

The relative volumes of liquid propane diluent and asphalt-bearing oil thus mixed and introduced into the precipitating chamber may be regulated and varied to determine, within limits, the type of asphaltic material precipitated in the chamber 24. If it is desired to have a settled asphaltic precipitate in the bottom of the precipitating chamber 24 which is semi-liquid in character, the volumetric ratio of the propane to the oil will be within a range of approximately 0.6–6 to 1 depending upon the character of the crude from which the oil was derived and the degree to which it was topped. Higher volumetric ratios than this will result in the precipitation of the asphalt as a slurry of substantially pure bitumen and propane.

As stated hereinbefore, a portion of this asphaltic precipitate settles readily and quickly and it may be expelled from the chamber through pump 25 and line 26. However, a substantial portion of the precipitated asphalt usually remains in the oil diluent solution within the separating chamber in the form of a finely divided precipitate which persists in suspension and which it is impractical to remove in a reasonable length of time by settling. Heretofore this finely divided asphaltic precipitate has remained in the oil resulting in a contamination of the final product.

The said oil diluent solution containing the suspended asphaltic precipitate is withdrawn from the precipitating chamber 24 through valve 27 and line 28 and introduced into the electric treating chamber 30 where it is subjected to an intense electric field established between the central electrode 31 and the inner surface of the said chamber 30. A substantial portion of the asphaltic suspension is deposited in a layer upon the chamber and treater electrode surfaces under the influence of the electric field. That portion of the asphalt precipitate which is not so deposited is agglomerated or otherwise affected by the electric field so that it is more quickly settled and more readily filtered from the oil diluent solution. That portion of the asphalt which settles in the electric treating chamber 30 may be expelled through pump 33 and line 34. The oil diluent solution from which a portion of the asphaltic material has thus been separated in the electric treating chamber 30 but in which a residual quantity of asphaltic material may still be present, is withdrawn through valve 35 and line 36 and introduced through a valve 37 into a settling chamber 40. Here a substantial portion of the remaining asphaltic precipitate may be settled out of the solution and expelled by means of pump 41 through line 42.

The remaining oil-diluent solution from which substantially all the asphalt precipitate has thus been removed, is withdrawn from the settling chamber 40 through valve 45 and allowed to flow through line 46, valve 47, lines 48, 49 and 50 into the still 60 where the diluent is recovered from the oil by evaporation. The heat for the evaporation of the diluent is supplied to the still through heating coil 61. The treated oil from which the diluent has been removed by evaporation is withdrawn from the bottom of the still through line 65, cooler 66, and introduced through line 67 into the refined oil storage tank 70.

The diluent vapors pass from the top of the still through line 72 through the diluent recovery apparatus comprising a precooler 73, a compressor 74 and an aftercooler condenser 75. Here the diluent vapors are liquefied and are returned to the diluent storage tank 20 through the run down line 76.

Instead of flowing the oil-diluent solution containing the suspension of precipitated asphaltic bodies, which have been agglomerated under the influence of the electric field in the electric treater, into the settling chamber 40, it may be desirable to flow the same through the by-pass connections comprising valve 77 and line 78 and thence through valve 47 and lines 48, 79 and 80 and valve 81 through the filter 85. The fine electrically agglomerated asphaltic precipitate is thus removed in the filter 85 and the filtrate free from the asphaltic bodies is then introduced by way of line 87 and valve 88 and through the pipe 50 into the still 60. Under these operating conditions, valves 82 and 83 are closed and valves 81 and 88 are opened.

It is desirable at times to run the oil diluent solution containing the electrically agglomerated asphaltic precipitate both through the settling chamber 40 and the filter 85 as a precaution against carrying over any traces of extremely finely divided asphaltic material. When the apparatus is so operated, the before mentioned by-pass connections comprising valve 77 and line 78 are closed off and the liquid is withdrawn from the settling chamber 40 through the valve 45 and line 46 and from there through the filter as just described. Under some conditions and with certain asphaltic oils undergoing treatment, the asphaltic precipitate is sufficiently completely removed in the electric treater 30 to be run directly to the still without prior passage through the settling chamber 40 or the filter 85.

The above described deasphalting operations are primarily related to a single stage process wherein the asphalt removed from the oil is essentially a mixture of all of the precipitatable asphaltic constituents. It is desirable, however, at times to carry on the deasphalting process in two or more stages whereby the removed asphaltic material is in effect separated or fractionated, with the result that two or more types of asphaltic materials are obtained. The drawing illustrates apparatus capable of performing a two-stage operation of deasphalting, but additional similar stages may obviously be added. The two-stage operation is as follows. Asphalt-bearing oil and diluent are mixed and introduced into the settling chamber 24 as described hereinbefore, but only sufficient diluent is added to the oil to cause a precipitation of the type of asphalt desired to be separated in the first stage of treatment. For example, if a relatively small volumetric proportion of propane is mixed with the oil the asphaltic material precipitated in the chamber 24 will be relatively hard, consist of substantially pure bitumen and have a high melting point. The oil diluent solution carrying the suspended portion of the precipitated hard asphaltic material is then withdrawn from the settling chamber 24 and introduced into the first electric treater 30 through the valve 27 and line 28 as also described hereinbefore. The hard asphalt is removed in the electric treater 30 by electrodeposition and/or settling under the influence of the electric field and the partially deasphalted oil-diluent solution is withdrawn therefrom through valve 35, line 36 and introduced through valve 37 into the second precipitating chamber 40.

Before this deasphalted oil-diluent solution enters the precipitating chamber 40, however, it may be mixed with an additional quantity of diluent which enters the stream through the line 90 and valve 91 leading from the diluent storage tank 20. The presence of this additional quantity of diluent will result in the precipitation of additional asphaltic material which in general is softer and has a lower melting point than that which is precipitated in the initial stage.

The oil diluent solution containing the additionally precipitated asphaltic material is withdrawn from the chamber 40 and introduced through valves 45 and 93 into the second stage electrical treater 100 where the asphaltic material which is precipitated by the said second addition of diluent may be removed by electrodeposition and settling under the influence of the electric field between the electrode 101 and the inner surface of the said electric treater.

The temperature of the partially deasphalted oil-diluent solution in chamber 40 may also be lowered by reduction of pressure and the resultant evaporation of a portion of the volatile diluent, to cause further precipitation of the heavy viscous pseudo-asphaltic oil fractions therein. This may be accomplished either with or without the addition of diluent. The pseudo-asphaltic material thus precipitated may be subsequently electrically separated in the electric treater 100 as just described.

The oil-diluent solution free from asphaltic precipitate is then withdrawn from the electric treater 100 through valve 82 and lines 79, 49 and 50 to the still where the diluent is removed as described hereinbefore.

The asphaltic material which is electrically deposited in the layer on the electrode and electric treater surfaces in both electric treaters may be removed either continuously or intermittently by means of suitable scrapers, not shown. The asphaltic material removed in the electric treater 100 is expelled through pump 102 and line 103.

The processes described hereinbefore have been adapted primarily to the separation of asphaltic and resinous bodies from the oil. Much of the oil which it is necessary to thus treat for the removal of the asphaltic and resinous bodies also contains substantial quantities of paraffin, wax, petrolatum and the like waxy and gummy substances. Such oils containing both the asphaltic and waxy substances can be simultaneously deasphalted and dewaxed, or they can be deasphalted and dewaxed in separate successive stages by the process of this invention in the apparatus disclosed in the drawing.

When it is desired to simultaneously deasphalt and dewax, the asphalt-bearing oil and the diluent, preferably a liquid normally gaseous hydrocarbon diluent such as propane, are mixed and introduced into the chamber 24 as described hereinbefore except that the pressure in the said chamber 24 is reduced to a value below that which is necessary to maintain the propane in the liquid phase. The resulting evaporation of the propane under the reduced pressure cools the oil diluent solution therein by self-refrigeration. Propane gas escapes from the chamber 24 through the line 106 to the propane recovery system and the pressure and the corresponding temperature in the chamber 24 is regulated by means of the valve 105. Ordinarily the pressure in chamber 24 is maintained at a value between 0 and 25 pounds per square inch gauge which corresponds to a chamber temperature of approximately −40° to 0° F.

The result of the dilution and chilling of the oil is the precipitation of asphalt and wax together in the chamber 24. The oil diluent solution containing precipitated wax and asphalt may be continuously withdrawn from the precipitating chamber 24 through the valve 27 and line 28 and introduced into the electric treater 30 where a substantial portion of the wax and asphalt precipitate is simultaneously electrically deposited on the electrode and treater surfaces under the influence of the electric field. That portion of the wax and asphalt precipitate which is not electrically deposited is agglomerated by the effect of the electric field with the result that it settles more quickly and is more readily filtered. The settling and filtration steps of the process are subsequently carried on as described hereinbefore in connection with the deasphalting processes.

The deasphalting and dewaxing stages may be carried out in two successive stages wherein substantially all of the asphalt is first precipitated by the addition of sufficient diluent in the precipitating chamber 24 at normal temperatures or at temperatures above that at which the wax will precipitate in any substantial quantity. The asphalt thus precipitated may be removed in the electric treater 30 as described hereinbefore. The oil-diluent solution from which the asphalt has thus been removed in the first stage of the treatment is then withdrawn from the electric treater 30 and introduced into the second chamber 40 where the wax is precipitated by chilling. The chilling of the oil-diluent solution may be accomplished in the chamber 40 by self-refrigeration wherein a portion of the diluent is allowed to evaporate under a reduced pressure. Additional diluent may be introduced through line 90 and valve 91 to compensate for that loss by evaporation in the self-refrigeration process. The gas resulting from the partial evaporation of the diluent escapes from the top of the chamber 40 through the line 108 to the diluent recovery system. The temperature and the pressure in the chamber 40 are thus controlled by the valve 109.

The oil-diluent solution containing wax which has been precipitated in chamber 40 as a result of the cooling is withdrawn through valves 45 and 93 and introduced into the second electrical treater 100 where a substantial portion of the wax is removed by deposition upon the electrode and treater surfaces under the influence of the electric field. That portion of the wax which is not electrically deposited is agglomerated under the influence of the electric field so that it is more quickly settled and more readily filtered. The portion of the wax thus agglomerated may be subsequently filtered through the filter 85 and resulting deasphalted and dewaxed oil is introduced into the still 60 where the solvent is removed and from which the solvent-free oil is withdrawn through line 65, cooler 66 and line 67 to the refined oil storage tank 70.

The electrical treaters 30 and 100, as well as the chambers 24 and 40 are provided with suitable vapor bleed lines leading to the solvent recovery system.

The electric potential in the electric treaters 30 and 100 is applied to the electrodes therein 31 and 101 respectively, through suitable electrical connections 110 and 111 from a suitable high electric potential source such as the generator 112.

The settling chambers 24 and 40 are provided with bottom pipe connections 115 and 116 respectively so that all of the contents of the settling chambers including the sediment can be introduced into the following electrical treating stages where complete separation is accomplished by subsequent electrical treating.

It has been found that oils which have been deasphalted and dewaxed by the electrical refining method have improved color characteristics, the undesirable color bodies evidently having been removed by electrodeposition and/or agglomeration in the electric treating stages of the process.

It has also been discovered that the color of oils in general can be improved by subjecting the oils containing undesirable color bodies to the influence of an electric field. This electrical decoloring process may be independently performed upon oil subsequent to conventional deasphalting and dewaxing, or it can be performed upon oils which contain color constituents but are free from asphalt or wax. These color bodies appear to be present in the oil both in colloidal suspension and in part in solution. Those color bodies present in oils in the form of colloids can be removed by subjecting the oil at normal temperature, preferably in the presence of a diluent in the case of viscous oils, to an intense electric field between electrodes. The color bodies are found, under these conditions, to deposit in a layer upon an electrode surface in contact with the color-containing oil. It is found also that those colloidal color bodies which are not removed from the oil in the form of an electrically deposited layer upon an electrode surface are agglomerated whereby they are rendered more readily removable by subsequent filtration, settling and clay treatment.

The color constituents of oil which are normally present there in the states of more or less true solutions can be precipitated into colloidal or finely divided suspensions which are susceptible to removal by the electrical decoloring process by dilution with a selective solvent such as liquid propane and/or by cooling.

In the case of mineral oils, the color bodies appear to be of a carbonaceous asphaltic, resinous or gummy character, while in the case of animal or vegetable oils the color bodies appear to comprise in addition to resinous and gummy substances, also fatty substances, unsaturates and oxidation products.

As a specific example of the electrical treatment of oils for decoloring, the following is an exemplary illustration:

Many oils, even though they are acid treated and distilled or percolated with clay, still may have colloidally dispersed color bodies, probably carbonaceous in nature which impart to the oil a characteristic color. As for example, red oil distillates or residual oils even though they are substantially asphalt-free, still contain colloidally dispersed color bodies. We have found such oils, if passed through an electric field of the nature herein described, are improved in color, presumably by the removal of these colloidally dispersed bodies. Thus, for example, a distillate produced from a Santa Fe Springs residual oil, when subjected to a potential of about 60,000 volts per inch, is materially improved in color and converted from an oil of dark red or substantially black, to a light red color. In operating with this oil, it is preferable to dilute the oil with a diluent, such as liquid propane or other light liquid normally gaseous hydrocarbon, usually at normal temperatures, and pass it through the precipitating chamber where it is subjected to a potential just below the spark-over potential or at about 60,000 volts per inch. The color may be additionally improved if operation is carried out at a lower temperature. Thus, the oil and propane solution may be chilled, preferably by self-refrigeration to a temperature of about −40° F. in chamber 24 by adjusting the valve 105 to maintain an internal pressure of about atmospheric and then discharged into the treater 30 where it is subjected to the electric potentials as heretofore described. At this lower temperature the solubility of the color constituents are diminished and these materials formerly in solution appear as very finely dispersed bodies or colloidal suspensions which are readily separated under the influence of the electric field. This process of decoloring, as stated before, is equally applicable to oils produced from substantially non-asphaltic oils such as Pennsylvania and Mid-Continent crude oils and oils which do not contain wax, produced from pure asphaltic oils such as Poso Creek, or Coalinga crude oils. Such oils may be subjected to this electrical precipitation treatment either before or after a treatment with sulfuric acid. The oil, after it has been subjected to this electrical treatment may be processed further either by treatment with sulfuric acid or with clay or with sulfuric acid and clay. The electrical treatment will agglomerate the colloidal coloring bodies and will also plate them upon the electrode surfaces. The colloidally agglomerated bodies are then easily removed by treatment with concentrated dilute sulfuric acid or may be removed by direct treatment with adsorbent clays such as bentonite, fuller's earth, Death Valley clay, Florida clay or other suitable dehydrated aluminum silicates, and acid treated montmorillonite, adsorbent carbons and the like.

While propane has been mentioned as an example of a suitable diluent to be employed in connection with the hereinbefore described deasphalting, dewaxing and decoloring processes, numerous other solvents may be employed which have the desired antisolvent properties with respect to the asphaltic bodies in the oil. Such solvents are ethyl, methyl, propyl, and butyl alcohols, ketones, such as acetone, gasoline and other light hydrocarbon fractions such as benzene, liquid butane, isobutane, propane, ethane and methane, mixtures of alcohol and ether, and benzol and acetone.

The terms "asphalt" and "wax" have been employed for convenience throughout the process descriptions, but they are to be understood as inclusive of the other similar substances enumerated hereinbefore.

While self-refrigeration of the oil-diluent mixture by evaporation at reduced pressures has been disclosed herein, other common methods of cooling may obviously be employed. An outstanding advantage of the electrical treatment according to this invention is that quick cooling or "shock chilling" can be employed to advantage to precipitate waxy and asphaltic bodies in the oils without loss of efficiency of the subsequent electrical separation method, as contrasted with the heretofore employed separation processes employing settling or filtering.

Another advantage of the electrical treatment according to this invention is that the waxy asphaltic and resinous precipitates separated from the oil solutions by electrodeposition upon the electrode surfaces or removed by filtration subsequent to electrical agglomeration, are freer from included oil and diluent than are the ordinary precipitates obtained by simple settling or filtration.

Potentials employed in the electric treaters are preferably unidirectional and may have a gradient of 5000 to 60,000 volts per inch between the electrodes immersed in the oil mixture.

The types of oils to which the process of this invention for electrical refining of oil is applicable are cracked residues, lubricating oil, gasoline, kerosene, fuel oil, and the like hydrocarbon oils, any one of which may carry quantities of the hereinbefore mentioned undesirable constituents. The process is also applicable to the treatment of Diesel engine fuel, particularly that fuel formed by blending a relatively light hydrocarbon fraction such as gas oil with a heavy residual oil, such as that from cracking stills, which may contain considerable quantities of asphaltic, resinous and carbonaceous constituents detrimental to the proper operation of Diesel injection systems. The blending of the light hydrocarbon oil with the heavy residual oil may cause the precipitation in the resulting blend, of additional asphaltic bodies which can only be properly removed subsequent to the blending operation. Where the blended Diesel fuel oil is to be employed under low temperature conditions, it is chilled to precipitate additional asphalt and wax preparatory to the electrical deasphalting and dewaxing treatment.

The process is also similarly applicable to the treatment of vegetable and animal oils for the removal of precipitatable fatty matter.

As an illustrative example of the deasphalting and dewaxing process, a Santa Fe Springs residual lubricating oil stock was diluted with eight parts of propane and the resulting precipitate and oil then separated in settler or precipitating chamber 24. The supernatant solution of the oil was withdrawn through 27. The solution contained substantial quantities of unsettled asphalt both colloidally and mechanically suspended in the solution of propane. The solution was then passed into chamber 30 where it was subjected to a high unidirectional electric potential of about 60,000 per inch gradient. This potential was as high as may be obtained without disruption of the solution in the chamber. The oil, after subjection to this potential was withdrawn through valve 35. It was found that this solution was clear and bright and substantially free of all colloidally dispersed asphaltic particles. The oil was also free of all colloidal resinous material and practically free of all other suspended or colloidal material. The oil was then passed into precipitating chamber 40 where its temperature was dropped to about +20° F. by evaporating a portion of the solvent at a reduced pressure. Additional material was then precipitated out of the chilled solution in chamber 40, and the supernatant solution was withdrawn through valve 45 and into chamber 100 for further treatment for the removal of the unsettled colloidally dispersed or suspended material by again subjecting it in chamber 100 to a high unidirectional electric potential of the same nature as that employed in treater 30. When desired, oil from chamber 30 is also dewaxed by further dropping the temperature to approximately −40° F. by releasing the pressure in the chamber 40 through valve 109 to about atmospheric. Wax and other material precipitated at the low temperature are then removed in the electric treater 100 as above described. The oil after treatment in chamber 30, if subsequent dewaxing at subnormal temperature as just described is not desired, may be passed directly to the filter 85. In the event chamber 30 is operated at such rates that the agglomerated material is not completely removed by electrodeposition or settling therein, the electrically agglomerated material may be finally filtered in filter 85 as previously described. By operating at relatively low rates the electrically treated matter is either plated or completely agglomerated or settled. By operating at high rates a considerable portion of the electrically agglomerated material is carried through without deposition or a portion of the plated material may be eroded from the electrodes and withdrawn through valve 35. In such case it is desirable to pass such agglomerated or swept-out material through the filter, and such material is found to be more readily filtered than the original precipitate prior to such electric treatment. In the same way, the solution electrically treated in 100 may also be subsequently filtered if it is found that the precipitated material is not completely removed by plating and settling.

The process is also applicable for the purification of cracked residuums. In the process of conversion of petroleum oil into lighter products by cracking, there is formed a residual product containing considerable asphaltic carbonaceous material, and also free carbon. This free carbon is usually removed by passage through a filter or by settling. We have found that this cracked or residuum may also be freed of this asphaltic and carbonaceous material by subjecting it to a high potential electric field as described hereinbefore. The oil may not necessarily be diluted with any of the asphalt precipitating diluents heretofore described, but may be passed at a temperature sufficiently high to render it fluid, for instance at about 200° F., into the treater 30 where it is subjected to a high potential electric field below the disruptive potential of the fluid. The asphaltic carbonaceous materials and the carbon particles are plated out upon the electrode surfaces and are also agglomerated. The agglomerated materials may be settled out or filtered with added facility in a manner as heretofore described. The settled material and material removed from the electrode surface is withdrawn through the bottom of the electrical treater and may then be filtered. The cracked residuum is thus clarified and rendered substantially free of its colloidal and suspended carbonaceous and asphaltic materials. In order to improve the amount of separation it may be desirable to dilute this cracked material with any one of the asphalt precipitating solvents described hereinabove, and when this oil is so treated, it may then be processed in the same manner as hereinbefore described for the separation of asphalt from oils.

Fuel oils produced from non-cracked materials, which are known as "virgin" fuel oils, especially those used in Diesel engines, and known as "virgin Diesel fuel oils" often contain as contaminants colloidally dispersed asphalt, carbonaceous materials, and even suspended mineral matter. The herein described process of electrical purification is also applicable for the purification of these oils.

In carrying out this process the fuel oil may be pumped at normal temperatures if it is sufficiently fluid or at elevated temperatures sufficiently high to obtain mobility and fluidity, into the electrical treater without previous dilution, and subjected to a high electric potential as previously described. The colloidally dispersed material is agglomerated or deposited on the electrodes in the treater. The agglomerated material may be settled out in the treater or passed to a subsequent separation stage such as a filter.

As stated hereinbefore, this process of electrical refining is additionally applicable to the removal of preformed gums and the like polymerization products which form in motor fuels such as gasoline, kerosene and Diesel engine fuel oil. These gums are precipitated by chilling and/or by dilution of the fuel with a suitable antisolvent and the precipitate removed by electrodeposition upon electrode surfaces.

The foregoing is merely illustrative of the apparatus and processes of the invention, and is not limiting. The invention may include any method and apparatus which accomplishes the same within the scope of the claims.

We claim:

1. A process for deasphalting oil which comprises diluting the asphalt-bearing oil with a diluent antisolvent to asphalt to precipitate asphalt in the solution, subjecting the mixture to an electric field and separating asphalt from the oil.

2. A process for removing asphaltic bodies from oil which comprises commingling the oil with a diluent adapted to precipitate the asphaltic bodies in the oil, subjecting the oil containing the precipitated asphaltic bodies to the influence of an electric field and thereby converting the asphaltic precipitate into a form which is readily separable in character and separating the thus treated asphaltic precipitate from the oil.

3. A process for removing asphaltic bodies from oil which comprises commingling the oil with a diluent adapted to precipitate the asphaltic bodies in the oil, subjecting the oil containing the precipitated asphaltic bodies to the influence of an electric field and thereby converting the asphaltic precipitate into a form which is readily separable in character and filtering the thus treated mixture to remove the asphaltic precipitate from the oil.

4. A process for the removal of asphaltic bodies from oil which comprises commingling the oil with a diluent adapted to precipitate the asphaltic bodies in the oil, subjecting the oil containing the precipitated asphaltic bodies to the influence of an electric field and thereby converting the asphalt precipitate into a form which is readily separable in character and settling and separating the asphaltic precipitate from the oil.

5. A process for removing asphaltic bodies from oil which comprises commingling the oil with a diluent adapted to precipitate the asphaltic bodies in the oil, subjecting the oil containing the precipitated asphaltic bodies to the influence of an electric field and thereby converting the asphaltic precipitate into a form which is readily separable in character and depositing the thus treated asphaltic precipitate in a layer upon an electrode surface in contact with said oil.

6. A process according to claim 2 in which the asphalt-bearing oil is dissolved in a quantity of a liquid, normally gaseous hydrocarbon fraction to precipitate the asphaltic bodies.

7. A process for deasphalting oil which comprises diluting the asphalt-bearing oil with a diluent antisolvent to asphalt to precipitate a portion of the asphalt in the solution, subjecting the mixture to an electric field and separating asphalt from the oil, further diluting the asphalt-bearing oil from which asphalt has been removed with the said diluent to precipitate additional asphalt, subjecting the mixture to an electric field and separating additional asphalt from the oil.

8. A process for refining oil which comprises diluting the asphalt-bearing oil with a diluent to precipitate asphalt, resin, tar, color bodies and the like bodies present in the solution, subjecting the mixture to an electric field and separating asphalt, resin, tar, color and the like bodies present from the oil.

9. A process for refining oil which comprises commingling the oil with a diluent adapted to precipitate wax and asphalt in the oil, subjecting the mixture to an electric field, and separating the wax and the asphalt from the oil.

10. A process for deresinating oil which comprises diluting the resin-bearing oil with a diluent antisolvent to the resin to precipitate resin in the solution, subjecting the mixture to an electric field and separating resin from the oil.

11. A process according to claim 10 in which the resin is deposited upon an electrode surface under the influence of the electric field.

12. A process for removing color bodies from oil comprising commingling the oil with a diluent adapted to precipitate the color bodies in the oil subjecting the oil containing the color bodies to an electric field to agglomerate the color bodies and settling and separating the said color bodies from the oil.

13. A process for removing color bodies from oil comprising commingling the oil with a diluent adapted to precipitate the color bodies in the oil subjecting the oil containing the color bodies to an electric field, and depositing the color bodies from the oil in a layer upon an electrode surface 14. A process for refining oil which comprises diluting the oil with a liquefied normally gaseous hydrocarbon, subjecting the mixture while maintaining it at normal temperatures to an electric field and separating the resulting precipitate from the oil.

15. A process for separating asphalt, resin, tar, color bodies and the like substances from oil which comprises precipitating asphalt, resin, tar, color bodies and the like substances present therein with a liquefied normally gaseous hydrocarbon, subjecting the resulting mixture to an electric field and separating the said precipitate from the oil.

16. A process for refining oil which comprises precipitating asphalt in the oil, subjecting the mixture to an electric field and separating the asphalt from the oil, subsequently precipitating the wax in the oil from which asphalt has been removed, subjecting the waxy mixture to an electric field and separating wax from the oil.

17. The process for refining oil which comprises precipitating asphalt in the oil in the presence of a diluent, subjecting the mixture to an electric field and separating the asphalt from the oil, subsequently chilling the oil from which asphalt has been removed to precipitate wax therein, subjecting the waxy mixture to an electric field and separating wax from the oil.

18. A process for refining oil which comprises diluting the asphalt-bearing oil with a diluent anti-solvent to asphalt to precipitate asphalt in the solution, subjecting the mixture to an electric field, and separating asphalt from the oil, further diluting the oil from which asphalt has been removed with an additional quantity of the said diluent, cooling the mixture to precipitate wax in the solution, subjecting the solution containing precipitated wax to an electric field and separating wax from the oil.

19. A process according to claim 18 in which the wax is precipitated by shock chilling.

20. A process for refining oil which comprises precipitating asphalt in the oil, subjecting the mixture to an electric field and separating the asphalt from the oil by deposition on an electrode surface, subsequently precipitating the wax in the oil from which asphalt has been removed, subjecting the waxy mixture to an electric field and separating the wax from the oil by deposition on an electrode surface.

21. A process according to claim 8, in which the diluent comprises propane.

LYLE DILLON.
CLAUDE E. SWIFT.